United States Patent [19]

Korotky

[11] Patent Number: 5,566,381
[45] Date of Patent: Oct. 15, 1996

[54] MULTIFREQUENCY LIGHTWAVE SOURCE USING PHASE MODULATION FOR SUPPRESSING STIMULATED BRILLOUIN SCATTERING IN OPTICAL FIBERS

[75] Inventor: Steven K. Korotky, Toms River, N.J.

[73] Assignee: Lucent Technologies Inc., Murray Hill, N.J.

[21] Appl. No.: 396,822

[22] Filed: Mar. 2, 1995

[51] Int. Cl.$^6$ ............................................. H04B 10/04
[52] U.S. Cl. ...................................... 359/183; 359/161
[58] Field of Search ............................... 359/124, 173, 359/161–162, 183, 188, 279, 182; 385/3, 122; 370/12

[56] References Cited

U.S. PATENT DOCUMENTS

| | | | |
|---|---|---|---|
| 5,166,821 | 11/1992 | Huber | 359/238 |
| 5,303,079 | 4/1994 | Gnauck et al. | 359/188 |
| 5,329,396 | 7/1994 | Fishman et al. | 359/173 |
| 5,420,868 | 5/1995 | Chraplyvy et al. | 359/188 |

FOREIGN PATENT DOCUMENTS 0565035  10/1993  European Pat. Off. ............... 359/183

OTHER PUBLICATIONS

"Investigation of Rayleigh Wings and Brillouin–Stimulated Scattering in Liquids", M. Denariez & G. Bret, Physical Review, vol. 171, No. 1, Jul. 5, 1968, pp. 160–171.

"Optical Power Handling Capacity of Low Loss Optical Fibers as Determined by Stimulated Raman and Brillouin Scattering", R. G. Smith, Applied Optics, vol. 11, No. 11, Nov. 1972, pp. 2489–2494.

"Stimulated Brillouin Scattering in Monomode Optical Fiber", D. Cotter, Journal of Optical Communications, vol. 4, Mar. 1983, pp. 10–19.

"Suppression of Stimulated Brillouin Backscattering by PSK Modulation for High–Power Optical Transmission", A. Hadjifotiou & G. A. Hill, IEE Proceedings, vol. 133, pt. J, No. 4, Aug. 1986.

"Ti:LiNbO3 Integrated Optical Technology", S. K. Korotky & R. C. Alferness, *Integrated Optical Circuits and Components Design and Applications*, edited by L. D. Hutcheson, Marcel Dekker, Inc., pp. 169–226.

"Waveguide Electrooptic Devices for Optical Fiber Communication", S. K. Korotky & R. C. Alferness, *Optical Fiber Telecommunications II*, edited by S. E. Miller & I. P. Kaminow, Academic Press, Inc., pp. 421–465.

"Suppression of Brillouin Scattering in Lightwave AM–VSB CATV Transmission Systems", X. P. Mao et al., OFC/IOOC'93 Technical Digest, pp. 141–143.

Williams et al., "Simultaneous Suppresion of Stimulated Brillouin Scattering and Interferometric Noise in Externally Modulated Light Wave AM–SCM Systems", IEEE Photonics Technology Letters, vol. 6, No. 12, Dec. 1994, pp. 1476–1478.

*Primary Examiner*—Leo Boudreau
*Assistant Examiner*—Kinfe-Michael Negash
*Attorney, Agent, or Firm*—Brian K. Dinicola

[57] ABSTRACT

Spectral broadening over a large range using PM is achieved by a lightwave source without the need for a large phase modulation index and without expending a large amount of modulator RF drive power. In this lightwave source, a laser output signal is externally phase modulated by one or more modulation signals. The phase modulation employs one or more frequency drive signals (i.e., the modulation signals) each of whose amplitude is judiciously selected to produce an output spectrum having substantially equal spectral components over a predetermined range of frequencies. The predetermined frequency range is centered about the source frequency for the laser and resembles a comb. Each frequency drive signal is also selected to have a frequency (or frequency spacing from other drive signals) so that adjacent spectral components in the output spectrum of the modulated signal are produced with a frequency spacing which exceeds the SBS interaction bandwidth at the transmission wavelength of interest.

9 Claims, 3 Drawing Sheets

MULTIFREQUENCY LIGHTWAVE SOURCE USING PHASE MODULATION FOR SUPPRESSING STIMULATED BRILLOUIN SCATTERING IN OPTICAL FIBERS

TECHNICAL FIELD

This invention relates to a lightwave device and, more particularly, to a lightwave source designed for suppression of stimulated Brillouin scattering in the transmission fiber.

BACKGROUND OF THE INVENTION

In optical transmission systems and especially in systems having long unrepeatered fiber spans, it is important to launch as high an optical power into the transmission fiber as possible. Unfortunately, the amount of launch power usable at a particular wavelength is limited by nonlinear phenomena associated with the transmission medium. Such nonlinear phenomena include stimulated Brillouin scattering ("SBS"), stimulated Raman scattering, self-phase modulation, four-photon mixing and cross-phase modulation. These phenomena can degrade the optical signals and increase bit error rates for the data transported by the transmission system.

SBS is a nonlinear process requiring close attention in transmission systems employing silica fibers, narrow linewidth optical sources (typically, less than one megahertz), and operating between 1.0 μm and 1.6 μm because the Brillouin linewidth in the corresponding wavelength range is between 15 MHz and 40 MHz. SBS can be significant for power levels as low as 1 mW in single-mode optical fibers. The efficiency for SBS decreases as the linewidth of the optical source is increased. Consequently, artificial broadening of the spectrum of the optical source through optical modulation, for example, serves as a means of increasing the SBS threshold. The SBS power threshold is arbitrarily defined as the input optical pump signal power level at which the power of the input optical pump signal becomes equal to the power of the backward Stokes signal.

Both direct frequency modulation ("FM") and external phase modulation ("PM") have been demonstrated as effective means of SBS suppression in lightwave systems. Both modulation techniques introduce a predetermined amount of spectral broadening to the transmitted signals.

The direct FM approach uses a dither signal on the laser bias to provide large frequency excursions, usually on the order of 10 GHz. Through the use of this technique, the SBS threshold has been increased as much as 15 dB. However, direct FM of an injection laser also results in substantial amplitude modulation ("AM"), called residual AM, that degrades system performance.

Phase modulation suppresses SBS and avoids the production of residual amplitude modulation. Using an external optical phase modulator driven with a single-frequency sinusoidal signal, it is possible to attain a 5 dB increase in the SBS threshold. It has proven impractical to increase the SBS threshold further by using PM with a high modulation index because the required modulator RF drive power very quickly increases to an unacceptably high level.

SUMMARY OF THE INVENTION

Spectral broadening over a large range using PM is achieved by a lightwave source without the need for a large phase modulation index and without expending a large amount of modulator RF drive power. In this lightwave source, a laser output signal is externally phase modulated by one or more modulation signals. Phase modulation employs one or more frequency drive signals (i.e., the modulation signals) each of whose amplitude is judiciously selected to produce an output spectrum having substantially equal spectral components over a predetermined range of frequencies. The predetermined frequency range is centered about the source frequency for the laser and resembles a frequency comb. Each frequency drive signal is also selected to have a frequency (or frequency spacing from other drive signals) so that adjacent spectral components in the output spectrum of the modulated signal are produced with a frequency spacing which exceeds the SBS interaction bandwidth at the transmission wavelength of interest.

Since the present lightwave source produces a comb of frequency components which have substantially equal power and have a desirable frequency spacing, the source is applicable to multi-wavelength communication systems.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

Optical phase modulation is performed on a laser output signal to provide spectral broadening of the output signal, to suppress SBS in the transmission fiber, and to increase significantly the SBS threshold, all without employing either a high RF power or a large phase modulation index. One or more frequency drive signals are provided to the optical phase modulator at specifically controlled amplitudes and at appropriately-spaced frequencies to insure that the phase modulation produces a unique set of output signal spectral components which have substantially similar power levels and a frequency spacing between components which is greater than the SBS interaction bandwidth. In preliminary experimental practice, this modulation technique produced a 17 dB increase in the SBS threshold, out of a theoretically possible 20 dB, using a total frequency drive signal power of less than 250 mW in a 1.5 μm single mode optical fiber.

One embodiment of the present modulation apparatus and method uses a set of multiple sinusoidal voltage waveforms of selected frequency spacing and selected drive amplitudes to drive a set of one or more optical phase modulators that are optically connected in series. Oscillation frequencies of the drive signals are considered to be distinct from one another and no requirements are placed on the relative phase of the drive signals. Peak-to-peak voltage of each of the individual electrical continuous-wave (cw) signals is chosen to provide a peak-to-peak phase modulation of approximately 0.9 π radians, regardless of the number of drive frequencies or phase modulators being employed. In the description which follows is a discussion of the principles of operation, the particular choice of voltage amplitude, and the selection of the set of drive frequencies.

Figure 1:
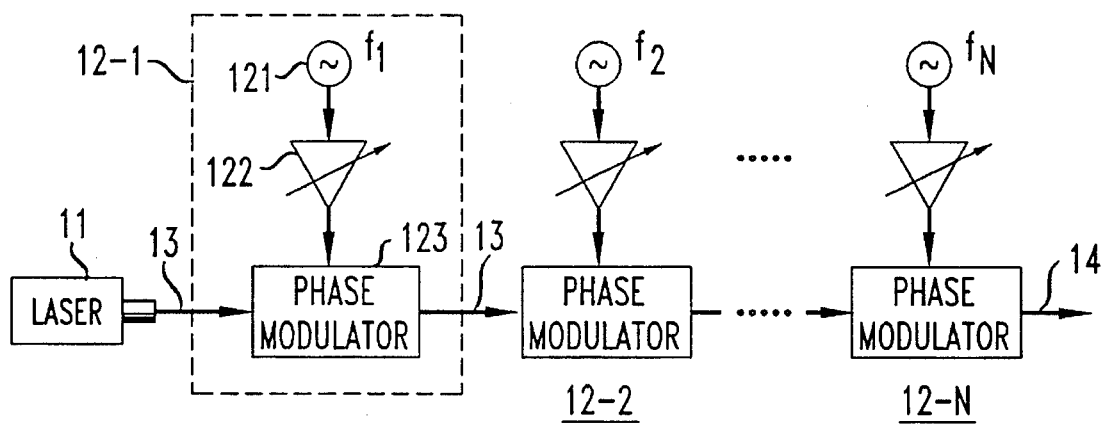
FIGS. 1 through 3 show various embodiments of the present multi-wavelength source for suppressing stimulated Brillouin scattering.
Figure 2:
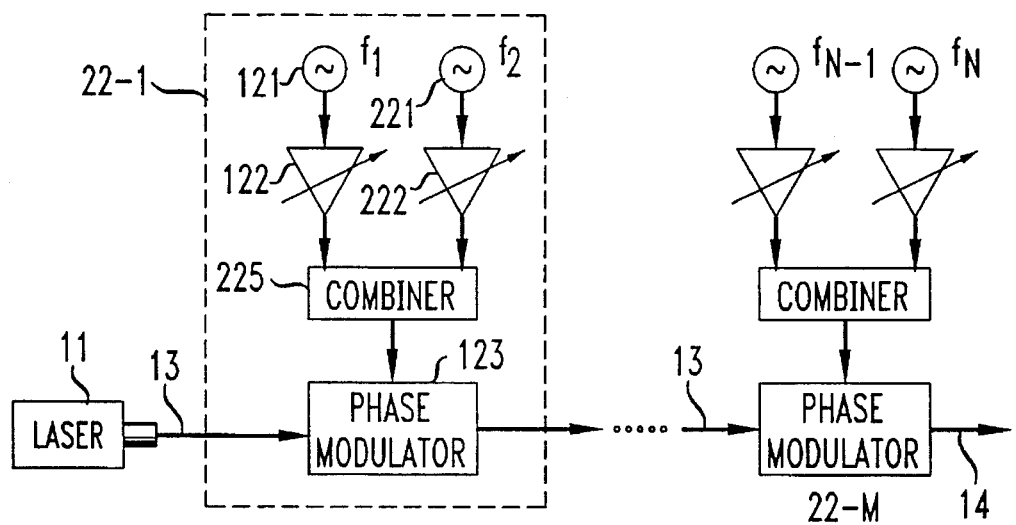
Figure 3:
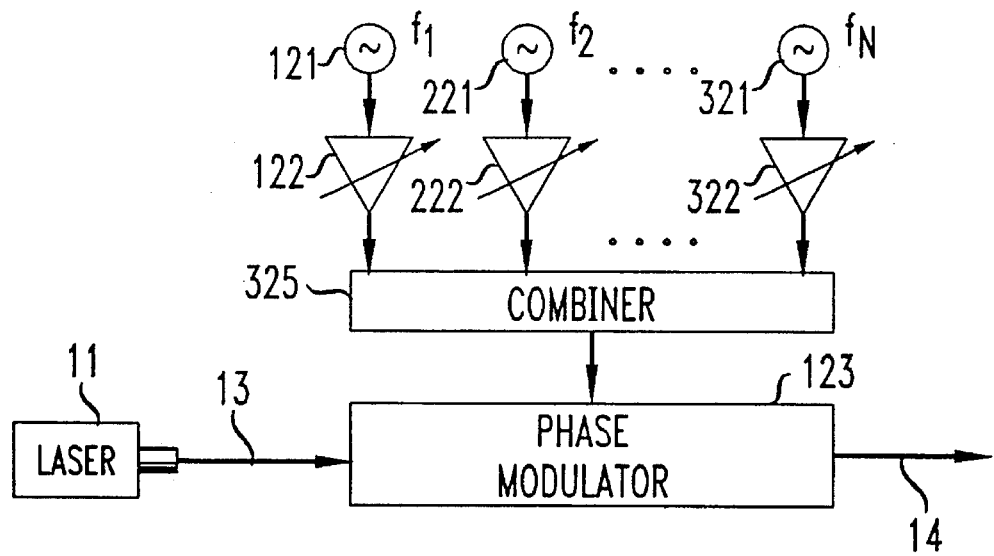

Consider the case when N distinct drive frequencies are employed. N is assumed to be an integer, odd or even, greater than or equal to one. Several of the many distinct possibilities for producing the desired phase modulation using N RF frequencies are illustrated in FIGS. 1 through 3. In FIG. 1, for example, each of N tones is applied to a separate phase modulator associated with the particular tone. In FIG. 2, N/2 phase modulators are shown integrated on a single chip and each modulator is driven with an associated pair of separate frequency drive signals. In FIG. 3, all of the tones are combined electrically into a composite signal which is then applied to a single phase modulator. All of these embodiments are substantially equivalent given the linearity of the operations. Each configuration can provide the same functionality as any other. Perhaps the most practical in many circumstances is the last configuration shown in FIG. 3 because of its economic use of elements. While it employs the most elements, the embodiment in FIG. 1 admits to the simplest presentation for purposes of understanding the principles of operation of the present invention.

FIG. 1 shows a multi-wavelength source for suppressing SBS. The embodiment in FIG. 1 includes optical source 11 optically coupled to a serial arrangement of N phase modulator sections 12. Each phase modulator section is substantially identical to the others except, of course, for the frequency of the tone and the gain of the adjustable amplifier which controls the amplitude of the drive signal applied to the phase modulator.

Exemplary phase modulator section 12-1 includes tone generator 121, adjustable amplifier 122, and optical phase modulator 123. These elements are electrically connected within the phase modulator section. Tone generator 121 emits a signal having a particular amplitude at a prescribed frequency. For section 12-1, the tone generator operates at frequency $f_1$. Adjustable amplifier 122 is controlled to amplify or attenuate the amplitude of the signal from the tone generator so that the signal has the desired amplitude for the phase modulator drive signal. The output signal from the amplifier is a frequency drive signal.

Figure 4:
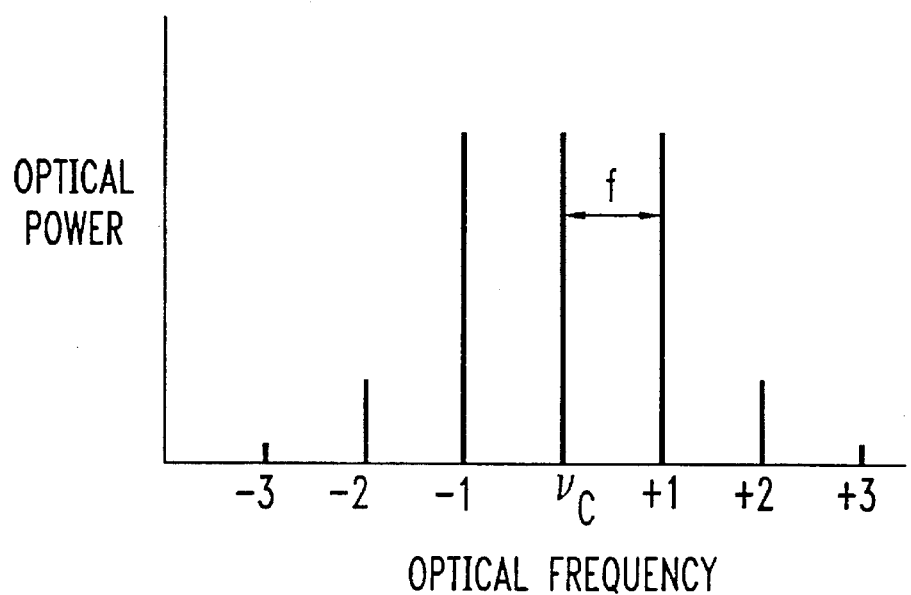
FIGS. 4 through 6 show output spectra for the present multi-wavelength source utilizing one or more frequency drive signals.

When any single one of the sinusoidal modulation signals or frequency drive signals is applied and the remaining ones are deactivated, the particular phase modulation index of approximately 0.9 $\pi$ radians (peak-to-peak) as described above produces an output signal 13 from the associated modulator section having an optical spectrum with first upper and lower optical sidebands, each sideband having an optical power equal to the power remaining in the optical carrier. This spectrum is illustrated in FIG. 4 where the optical carrier frequency is shown at $v_c$, the first order sidebands are shown at ±1, and the second and higher order sidebands are shown at ±2, etc.

Figure 5:
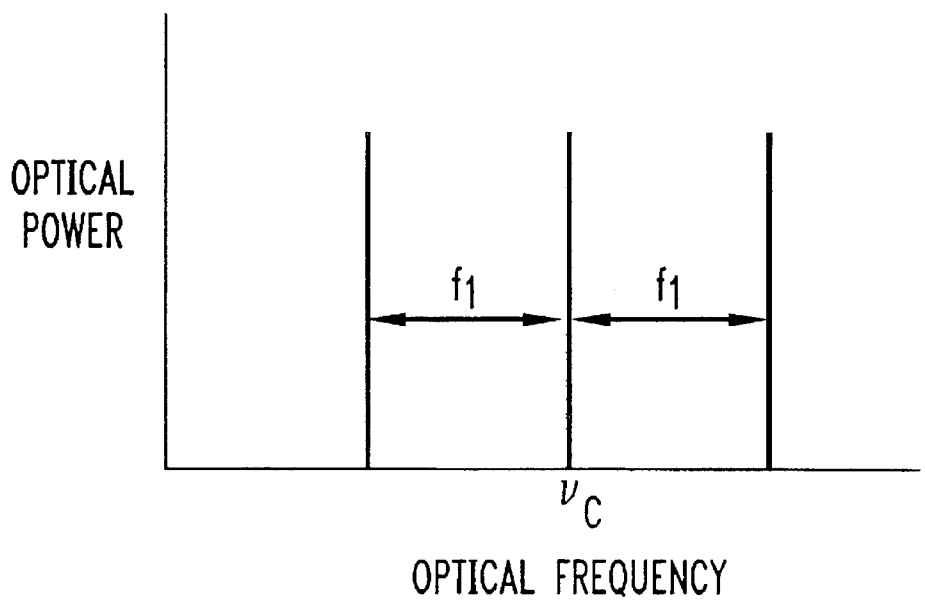

It should be noted that, when the amplitude of the drive signal is controlled as described above, there is very little power in the second and higher order sidebands. As such, for initial inspection, the higher order sidebands can be disregarded. If, for the moment, the second order sidebands are ignored completely, then the optical spectrum produced by this modulation technique and apparatus has its total optical power substantially evenly distributed among three optical frequencies as shown in FIG. 5. The frequency spacing between separate spectral components is determined by the electrical drive frequency. For the example described above, the three optical frequency components in this spectrum are $v_c$, and $v_c \pm f_1$. By choosing the electrical drive frequency to be a few times larger than the SBS gain bandwidth, which is approximately 20 MHz in typical optical fibers, it is possible to reduce the power in the individual optical frequency components in the phase modulated output signal and thereby cause an increase in the threshold for SBS. Assuming that the SBS reflected optical power grows as the square of the launched optical power near the threshold for SBS production, then distribution of the optical power equally among three spectral components at well-separated optical frequencies will result in an increase of the threshold by a factor of $1/(3\times\frac{1}{3}^2)=3$, or approximately 5 dB.

Next, referring to FIG. 1, we consider the effect of activating the second drive frequency to the second phase modulator. Without loss of generality, we assume that the first frequency, $f_1$, is the largest in the set, and the second, $f_2$, is the second largest and has an illustrative value of one-third of $f_1$, i.e. $f_2 \cong f_1/3$. In this example, the output of the first phase modulator section 12-1 acts as the optical source for the second phase modulator section 12-2. The resulting optical spectrum appears for output optical signal 14 includes nine different spectral components. These components occur at optical frequencies $v_c$, $v_c \pm f_1$, $v_c \pm f_2$, and $v_c \pm f_1 \pm f_2$. The output spectrum appears as if each of the three optical frequencies in the output of the first modulator section has been phase modulated, as before, to produce their own upper and lower sidebands. Here again, the distribution of power among all the optical tones is equal because of the selection of the frequency and amplitudes of the different drive signals. Thus, the output of the second phase modulator has a spectrum consisting of nine equally spaced frequencies centered on the original optical carrier (i.e. input to the first phase modulator) with uniform distribution of the optical power. The additional reduction in optical power at each discrete frequency in the output spectrum attained by using the second phase modulator section in principle results in an increase of the SBS threshold (relative to the absence of PM) of $1/(9\times\frac{1}{9}^2)=9$, or approximately 10 dB.

It is now possible to consider including additional drive frequencies, each drive signal occurring at one-third (⅓) the frequency of the lowest frequency drive signal in the previous set of frequency drive signals. By induction, when there are a total of N drive frequency signals, the optical power will be distributed equally among $3^N$ optical frequencies. In this case, the optical power is spread over an optical bandwidth of approximately $3^N$ times the smallest drive frequency, and the SBS threshold will be increased by the same factor, that is, $3^N$. As mentioned previously, the lowest drive frequency should be selected to be 2–3 times larger than the SBS bandwidth to attain the greatest increase in threshold.

It has been useful in the above description to consider assigning an individual phase modulator section for each drive frequency to elucidate the principle of operation of the present invention. If the mechanism for producing the optical phase shift is a linear function of the applied voltage, then it is possible to achieve substantially identical results by combining some or all of the periodically varying (e.g., sinusoidal) drive signal waveforms in the electrical domain and applying them to a single phase modulator.

The linear electrooptic effect or Pockels effect, which is present in materials such as lithium niobate and compound III—V semiconductors, displays this behavior, namely, producing an optical phase shift as a substantially linear function of the applied electrical signal. Thus, it is possible to obtain substantial increases in the SBS threshold can reliably be obtained with very low RF drive powers and simple and low cost hardware by using relatively small numbers of frequency drive signals (i.e., frequencies or tones) and a single electrooptic phase modulator. It is contemplated that three or four drive frequencies is suitable to accomplish the desired results and efficiencies.

While it is desirable to have a linear relationship between the output phase and the applied electrical signal (voltage) in the phase modulator, it is contemplated that other relationships can provide suitable results. For example, effective results may be anticipated if the phase-voltage relation is quadratic, such as in the Kerr effect.

More efficient (from a component count perspective) phase modulator sections and sources are shown in FIGS. 2 and 3. In FIG. 2, phase modulator section 22-1 is an exemplary section. Phase modulator section 22-1 includes a pair of tone generators 121 and 221 at frequencies $f_1$ and $f_2$, respectively, associated adjustably controllable amplifiers 122 and 222, signal combiner 225 and phase modulator 123. This embodiment reduces, by approximately a factor of two, the number of phase modulators required for the multiwavelength source. The signal combiner operates to combine the electrical signals, the two frequency drive signals, output from both connected amplifiers.

In FIG. 3, N tone generators 121, 221, and 321 are coupled to associated adjustably controllable amplifiers 122, 222, and 322. The amplifier outputs are connected to signal combiner 325 which combines the supplied frequency drive signals for application to phase modulator 123. This embodiment provides a considerable decrease in component count (fewer combiners and phase modulators) and is therefore a desirable candidate for integration on a single integrated circuit chip.

Although it has been described above that the optical source 11 is a laser, it is contemplated that the source could be realized as a light emitting diode or other light emitting apparatus. Since methods and apparatus for efficiently generating, manipulating, combining, and controllably amplifying electrical signals are well known, details of such methods and apparatus will not be discussed herein. Phase modulators such as Mach-Zehnder interferometer waveguide modulators employing dual drives are well known to persons skilled in the art for performing optical phase modulation.

In the preceding discussion, for each drive frequency, we have ignored the optical power present in all optical frequencies, except the first upper and lower sidebands and the carrier. The actual optical spectrum for a single drive frequency does have some power in higher order sidebands, which can effect the flatness of the power distribution in the optical spectrum in the central range of frequency components. For example, when the multiplication factor between drive frequencies is exactly 3, then the second-order sideband produced by a lower drive frequency for one of the higher drive frequency's sidebands will fall on top of the first-order sideband generated near the optical carrier. The coherent superposition of the optical amplitudes occurring at the same optical frequency will either add or subtract power at that optical frequency and thereby disturb the flatness and uniformity of the optical spectrum. While the consequence for the SBS threshold may not be very detrimental, this effect may be avoided by choosing a frequency multiplier slightly different from 3. Of the higher-order sidebands, only the second-order sidebands have sufficient power to warrant consideration to a first approximation. Consequently, a frequency multiplier greater than 3 will suffice to maintain a well equalized optical power distribution.

Figure 6:
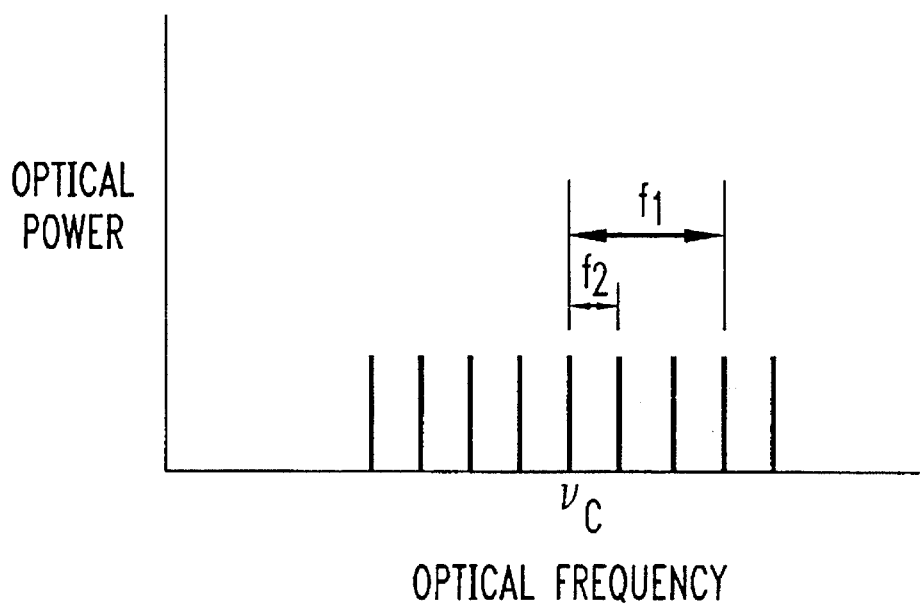

A second consideration related to the choice of the frequency multiplier is whether the higher-order sidebands fall within the SBS bandwidth of other sidebands. This can occur because SBS interaction does not distinguish tones separated by less than the SBS bandwidth. A desired offset of the optical frequencies of the higher-order tones may be accomplished by also choosing a multiplier greater than 3. Of course, arbitrarily large multiplication factors would result in very inefficient use of the available optical bandwidth and could cause dispersion or crosstalk penalties depending upon the application. For this reason, multiplication factors in the range of 3.1 to 3.5 appear attractive. The optical power distribution for a frequency multiplier of 3.5, which has been used experimentally with excellent results, is shown in FIG. 6. While the use of a constant frequency multiplier to specify the frequency hierarchy is conceptually attractive, another scheme is to chose the frequency spacing based on multipliers near 3, but each multiple slightly different from one another.

It should be understood that the method just described for producing a broad and dense, multi-frequency spectrum applies equally well to other sources of electromagnetic radiation, in addition to light, such as microwaves.

In an example from experimental practice, a prototype multi-wavelength source has been developed and tested in the lab and the results have confirmed that the optical power can be spread out as anticipated herein. Also, experiments have been run to demonstrate that an increase of the SBS threshold can be realized in excess of 17 dB above the CW threshold of +6 dBm using four drive frequencies (70, 245, 858, and 3001 MHz) and a total RF power of less than 250 mW. This translates into the ability to launch +25 dBm of optical power with a total reflected power of less than −20 dB, which is 2 dB more launch power than using FM. To my knowledge, this is the largest increase in the SBS threshold in optical fiber to date. In this experiment, the optical spectrum of the output signal contained 81 ($3^4$) major optical frequency components spread over an optical spectral window of 8.4 GHz. Preliminary evaluation of the 2.5 Gbps eye pattern showed no spurious or residual amplitude modulation.

Although not described in detail above, it is understood that the phase modulator sections can be interconnected and in turn connected to the source by fiber, dielectric or semiconductor waveguides, or even by free space optics, all of which are well known to persons skilled in the art.

What is claimed is:

1. Apparatus for producing a multi-wavelength electromagnetic radiation output signal comprising:

means for generating at least a first frequency drive signal; and a phase modulator responsive to a supplied electromagnetic radiation signal and the at least first frequency drive signal for producing the multi-wavelength electromagnetic radiation output signal, said first frequency drive signal having a frequency sufficient to cause adjacent spectral components of said output signal to be spaced farther apart than one stimulated Brillouin scattering interaction bandwidth, and said first frequency drive signal having an amplitude sufficient to cause each component in a dominant set of spectral components for the output signal to have substantially equal power.

2. The apparatus as defined in claim 1 wherein the means for generating at least a first frequency drive signal also generates a second frequency drive signal, said second frequency drive signal being at a frequency different from said first frequency drive signal, the frequency of said second frequency drive signal being sufficient to cause adjacent spectral components of said output signal to be spaced farther apart than one stimulated Brillouin scattering interaction bandwidth, and said second frequency drive signal having an amplitude sufficient to cause each component in a dominant set of spectral components for the output signal to have substantially equal power.

3. The apparatus as defined in claim 2 wherein the frequencies of the first and second drive signals being related by a geometric progression wherein a geometric multiplication factor therein is substantially equal to or greater than 3.

4. The apparatus as defined in claim 2 further including signal combining means coupled to the generating means and the phase modulator for electrically combining the at least first and second frequency drive signals into a single signal for application to the phase modulator.

5. The apparatus as defined in claim 4 further including amplifier means for controllably adjusting the individual amplitude of each frequency drive signal.

6. The apparatus as defined in claim 5 wherein each amplitude is controllably adjusted to produce a peak-to-peak phase modulation index substantially equal to $0.9\ \pi$ at a corresponding electrical frequency.

7. The apparatus as defined in claim 6 wherein the electromagnetic radiation is optical and said phase modulator produces phase modulation via an electrooptic effect.

8. A method for producing a multi-wavelength electromagnetic radiation output signal comprising the steps of:

generating at least a first frequency drive signal; and phase modulating a supplied electromagnetic radiation signal with the at least first frequency drive signal to produce the multi-wavelength electromagnetic radiation output signal, said first frequency drive signal having a frequency sufficient to cause adjacent spectral components of said output signal to be spaced farther apart than one stimulated Brillouin scattering interaction bandwidth, and said first frequency drive signal having an amplitude sufficient to cause each component in a dominant set of spectral components for the output signal to have substantially equal power.

9. The method as defined in claim 8 wherein the step of generating at least a first frequency drive signal also includes generating a second frequency drive signal, said second frequency drive signal being at a frequency different from said first frequency drive signal, the frequency of said second frequency drive signal being sufficient to cause adjacent spectral components of said output signal to be spaced farther apart than one stimulated Brillouin scattering interaction bandwidth, and said second frequency drive signal having an amplitude sufficient to cause each component in a dominant set of spectral components for the output signal to have substantially equal power.

* * * * *